(12) United States Patent
Yokoya

(10) Patent No.: US 11,805,233 B2
(45) Date of Patent: Oct. 31, 2023

(54) LENS APPARATUS AND IMAGE PICKUP APPARATUS

(71) Applicant: CANON KABUSHIKI KAISHA, Tokyo (JP)

(72) Inventor: Maki Yokoya, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/842,831

(22) Filed: Jun. 17, 2022

(65) Prior Publication Data

US 2023/0014923 A1   Jan. 19, 2023

(30) Foreign Application Priority Data

Jul. 2, 2021  (JP) .................................. 2021-110988

(51) Int. Cl.
*H04N 13/218* (2018.01)
*G02B 9/10* (2006.01)
*G02B 17/08* (2006.01)
*G02B 5/00* (2006.01)
*G03B 35/10* (2021.01)

(52) U.S. Cl.
CPC ............. *H04N 13/218* (2018.05); *G02B 9/10* (2013.01); *G02B 17/08* (2013.01); *G02B 5/005* (2013.01); *G03B 35/10* (2013.01); *H04N 2213/001* (2013.01)

(58) Field of Classification Search
CPC .......... G02B 9/10; G02B 17/08; G02B 5/005; H04N 13/218; G03B 35/10
See application file for complete search history.

(56) References Cited

U.S. PATENT DOCUMENTS

| 11,194,138 | B2 | 12/2021 | Yokoya | |
|---|---|---|---|---|
| 11,372,201 | B2 | 6/2022 | Ino et al. | |
| 2006/0215277 | A1* | 9/2006 | Sato | G02B 15/144113 359/687 |
| 2007/0223109 | A1* | 9/2007 | Tanaka | G02B 15/144113 359/692 |
| 2013/0278731 | A1* | 10/2013 | Inomoto | G03B 35/10 359/462 |
| 2020/0014908 | A1* | 1/2020 | Ebe | H04N 23/54 |

FOREIGN PATENT DOCUMENTS

JP  2020-008629 A  1/2020

* cited by examiner

*Primary Examiner* — William R Alexander
*Assistant Examiner* — Sharrief I Broome
(74) *Attorney, Agent, or Firm* — Carter, DeLuca & Farrell LLP

(57) ABSTRACT

A lens apparatus includes two optical systems each of which includes, in order from an object side to an image side, a negative first lens unit, a first reflective member, an aperture diaphragm, a second reflective member, and a positive second lens unit. Each optical system satisfies following inequalities:

$$5.9 < DR/f < 13.6$$

$$0.7 < D2/f2 < 5.2$$

$$10.4 < DP/f < 19.8$$

DR represents a distance on an optical axis from a reflective surface of the first reflective member to a reflective surface of the second reflective member. f represents a focal length of the optical system. f2 represents a focal length of the second lens unit. D2 represents a distance on the optical axis from the reflective surface of the second reflective member to an image plane. DP represents a distance on the optical axis from the aperture diaphragm to the image plane.

12 Claims, 6 Drawing Sheets ized in one image sensor.

LENS APPARATUS AND IMAGE PICKUP APPARATUS

BACKGROUND OF THE INVENTION

Field of the Invention

The present invention relates to a lens apparatus that is suitable for a digital video camera, a digital still camera, a broadcasting camera, a silver-halide film camera, a monitoring camera, and the like.

Description of the Related Art in recent years, there has been a demand for an image pickup apparatus for capturing a realistic image such as an image for virtual reality. In particular, there is a demand for a stereoscopic image pickup apparatus that has a total angle of view of about 180° and captures an image from two viewpoints with parallax that is close to parallax of a human's vision. Japanese Patent Laid-Open No. ("JP") 2020-008629 proposes a lens apparatus capable of capturing a stereoscopic image w % bile optical paths are bent so that image circles of two wide angle lenses are included in one image sensor.

In a case where a smaller image sensor is to be used in this configuration, it is necessary to dispose lens units of two parallelly disposed optical systems in close proximity to each other on a rear side (image side) of reflective surfaces each of which is closest to an image plane in the optical system. However, in the prior art disclosed in JP 2020-008629, the lens units of the two parallelly disposed optical systems interfere with each other on the rear side (image side) of the reflective surfaces closest to the image plane. Further, if a base length proper for stereoscopic viewing is to be ensured, it is necessary to make wider a distance between an optical axis of a lens unit on an object side of a reflective surface closest to an object and an optical axis of the lens unit on the image side of the reflective surface closest to the image plane. However, in the prior art disclosed in JP 2020-008629, the base length proper for stereoscopic viewing is not ensured.

SUMMARY OF THE INVENTION

The present invention provides a lens apparatus capable of performing stereoscopic imaging in which one small image sensor captures an image formed by each of two optical systems.

A lens apparatus according to one aspect of the present disclosure includes two optical systems. Each of the two optical systems includes, in order from an object side to an image side, a first lens unit having a negative refractive power, a first reflective member, an aperture diaphragm, a second reflective member, and a second lens unit having a positive refractive power. Each of the two optical systems satisfies following inequalities.

$5.9 < DR/f < 13.6$ $0.7 < D2/f2 < 5.2$ $10.4 < DP/f < 19.8$

DR represents a distance on an optical axis from a reflective surface of the first reflective member to a reflective surface of the second reflective member. f represents a focal length of the optical system. f2 represents a focal length of the second lens unit. D2 represents a distance on the optical axis from the reflective surface of the second reflective member to an image plane. DP represents a distance on the optical axis from the aperture diaphragm to the image plane.

An image pickup apparatus including the above lens apparatus also constitutes another aspect of the present disclosure.

Further features of the present invention will become apparent from the following description of exemplary embodiments with reference to the attached drawings.

DESCRIPTION OF THE EMBODIMENTS

Referring now to the accompanying drawings, a description will be given of a lens apparatus according to each example. Each example arranges two optical systems parallelly with respect to an image sensor so as to obtain a stereoscopic image.

Figure 1:
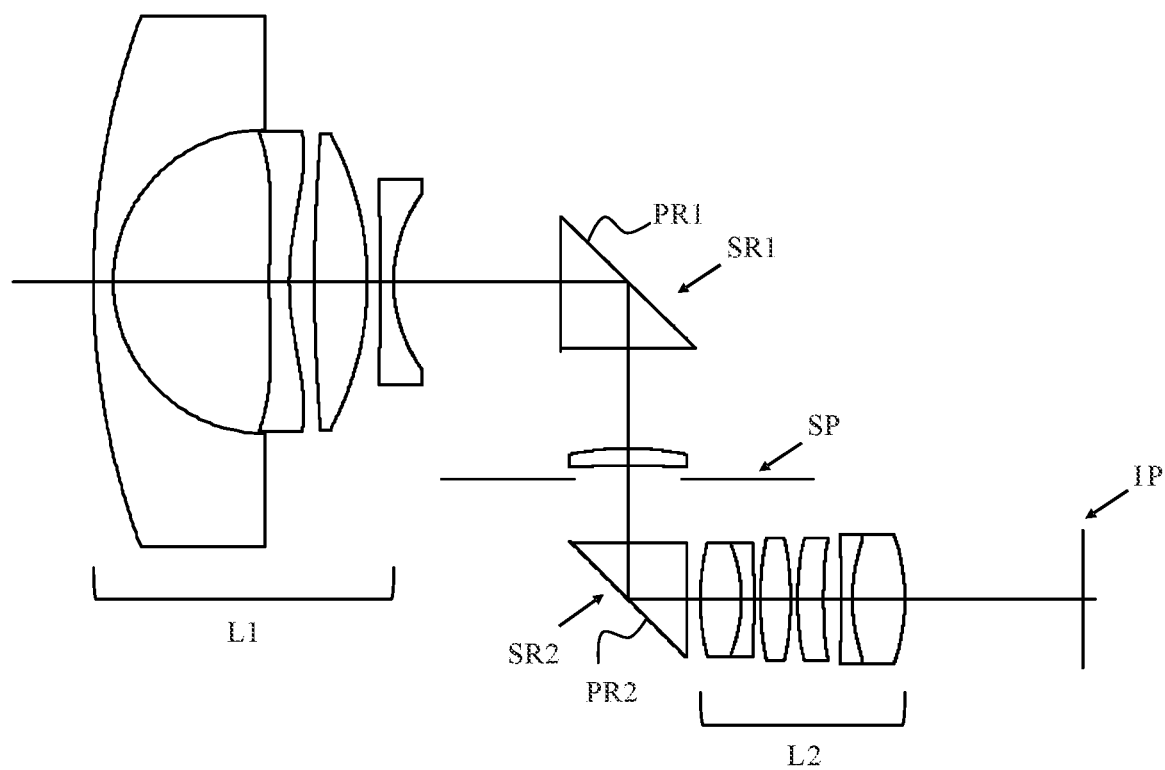
FIG. 1 is a sectional view of an optical system according to Example 1.
Figure 2:
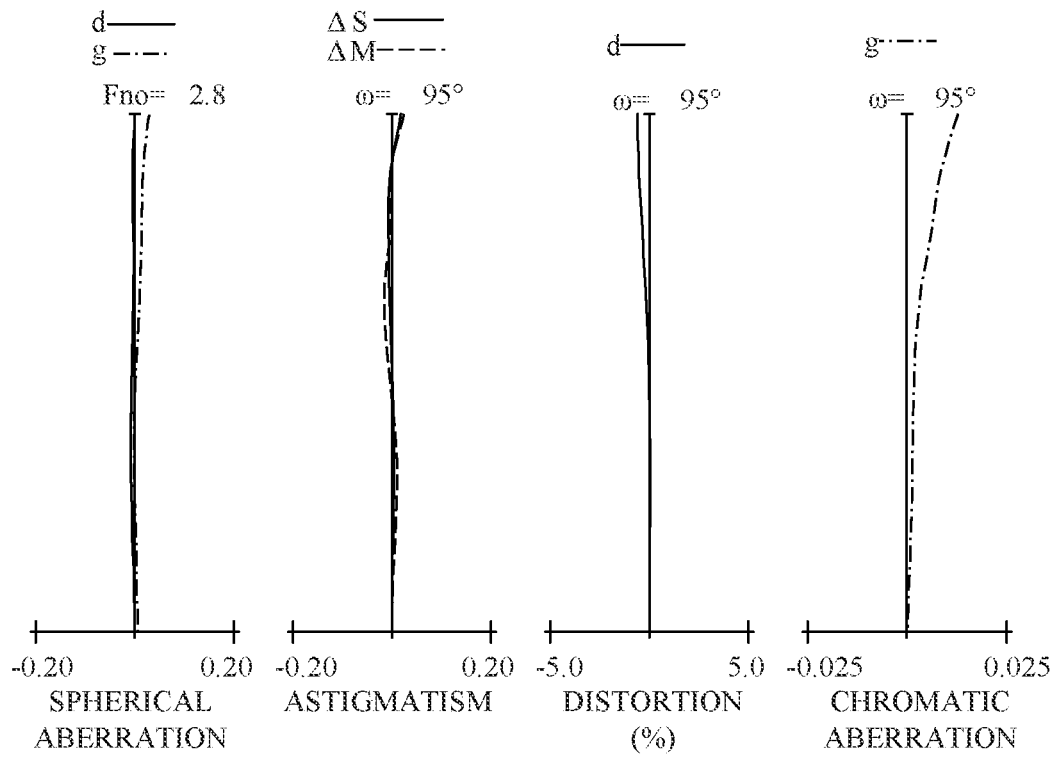
FIG. 2 is aberration diagrams of the optical system according to Example 1.
Figure 3:
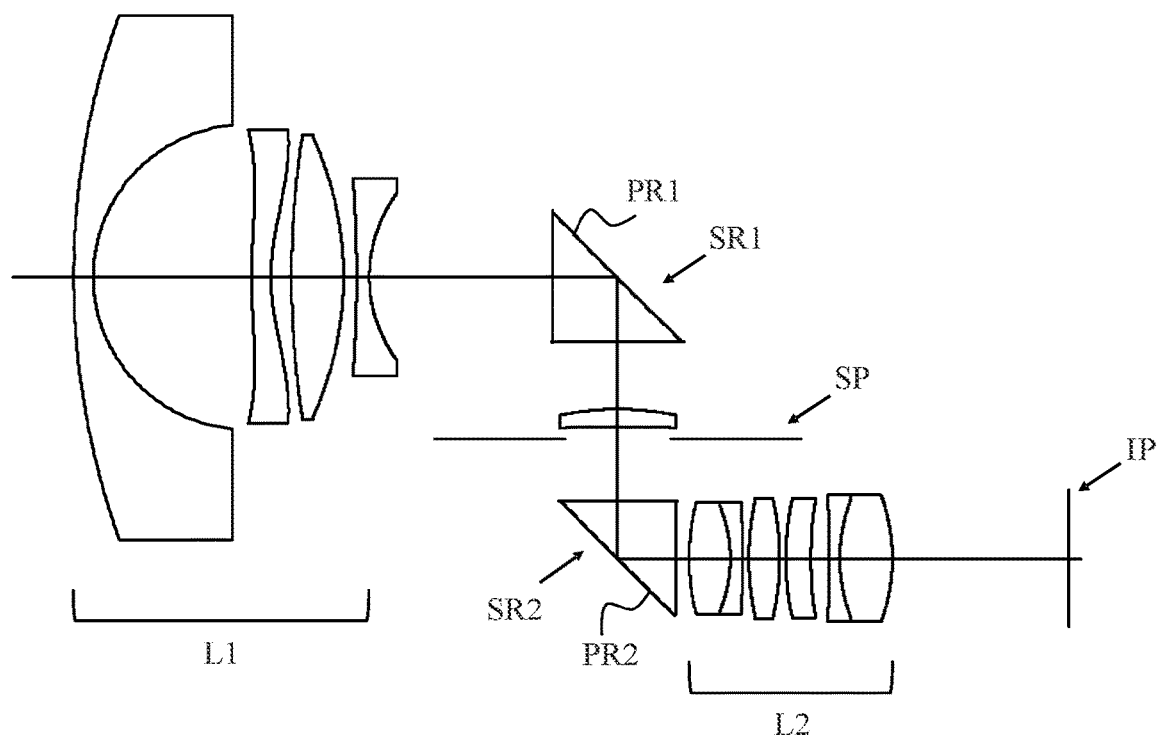
FIG. 3 is a sectional view of an optical system according to Example 2.
Figure 4:
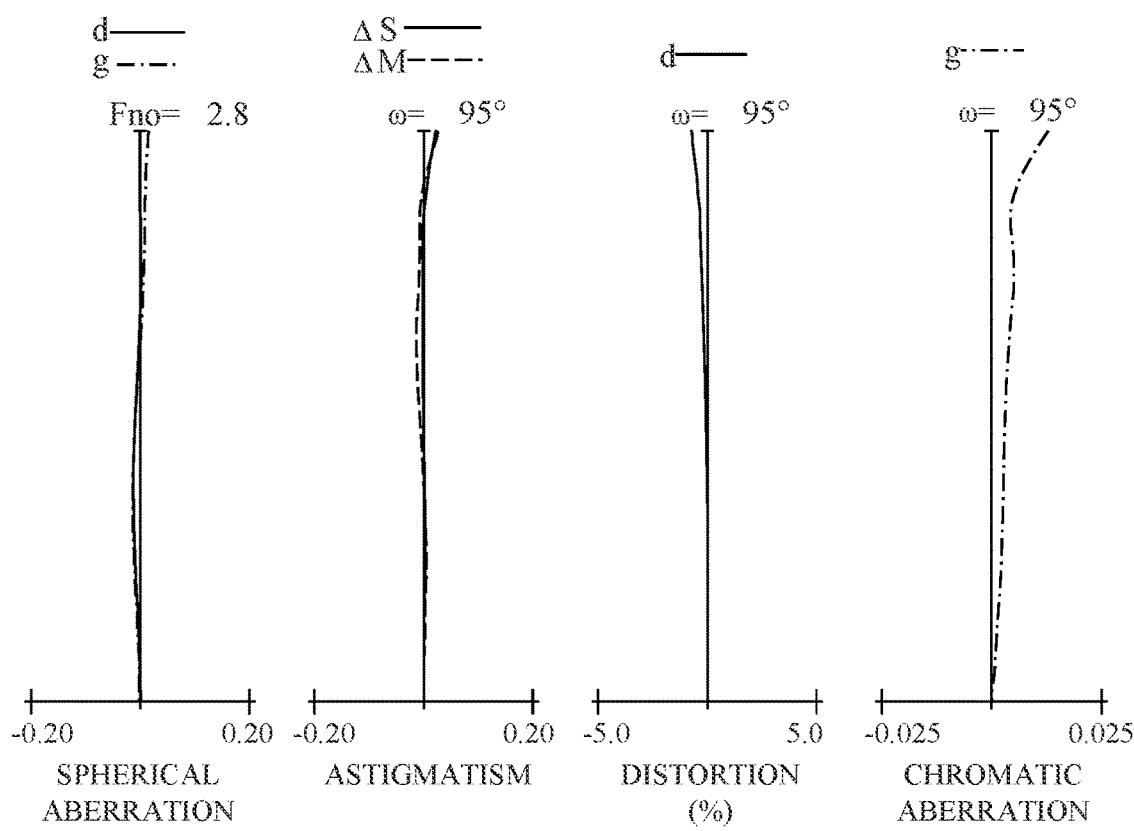
FIG. 4 is aberration diagrams of the optical system according to Example 2.
Figure 5:
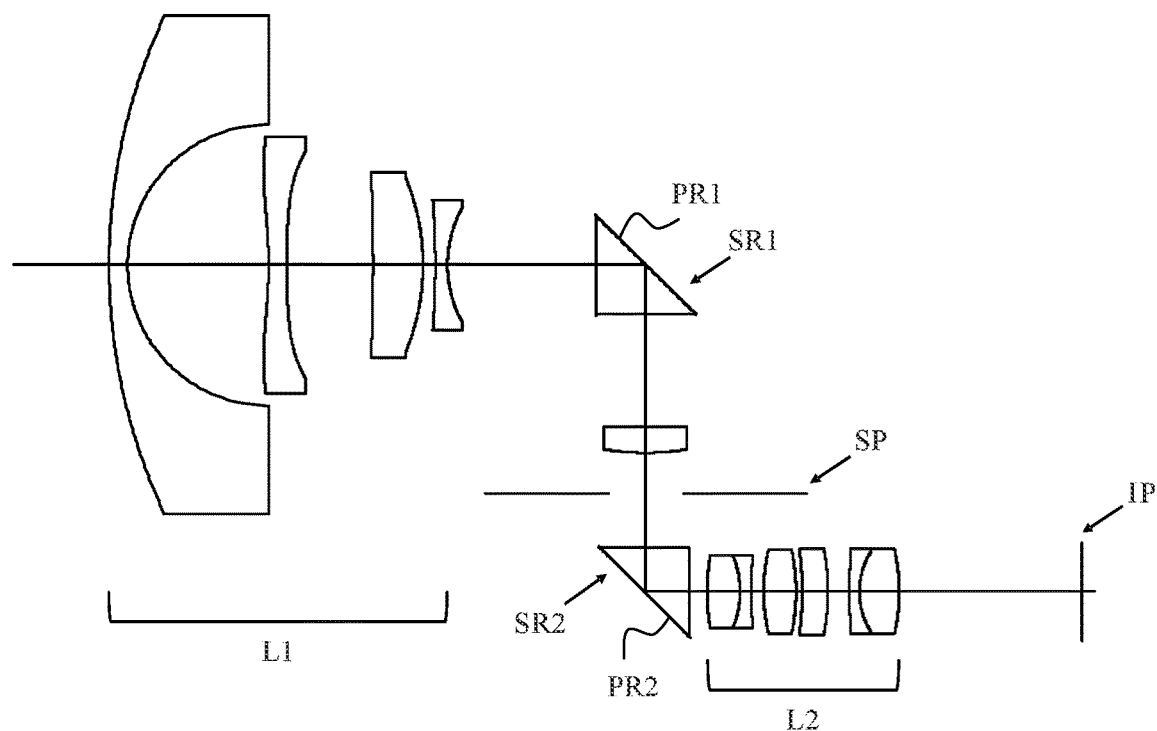
FIG. 5 is a sectional view of an optical system according to Example 3.
Figure 6:
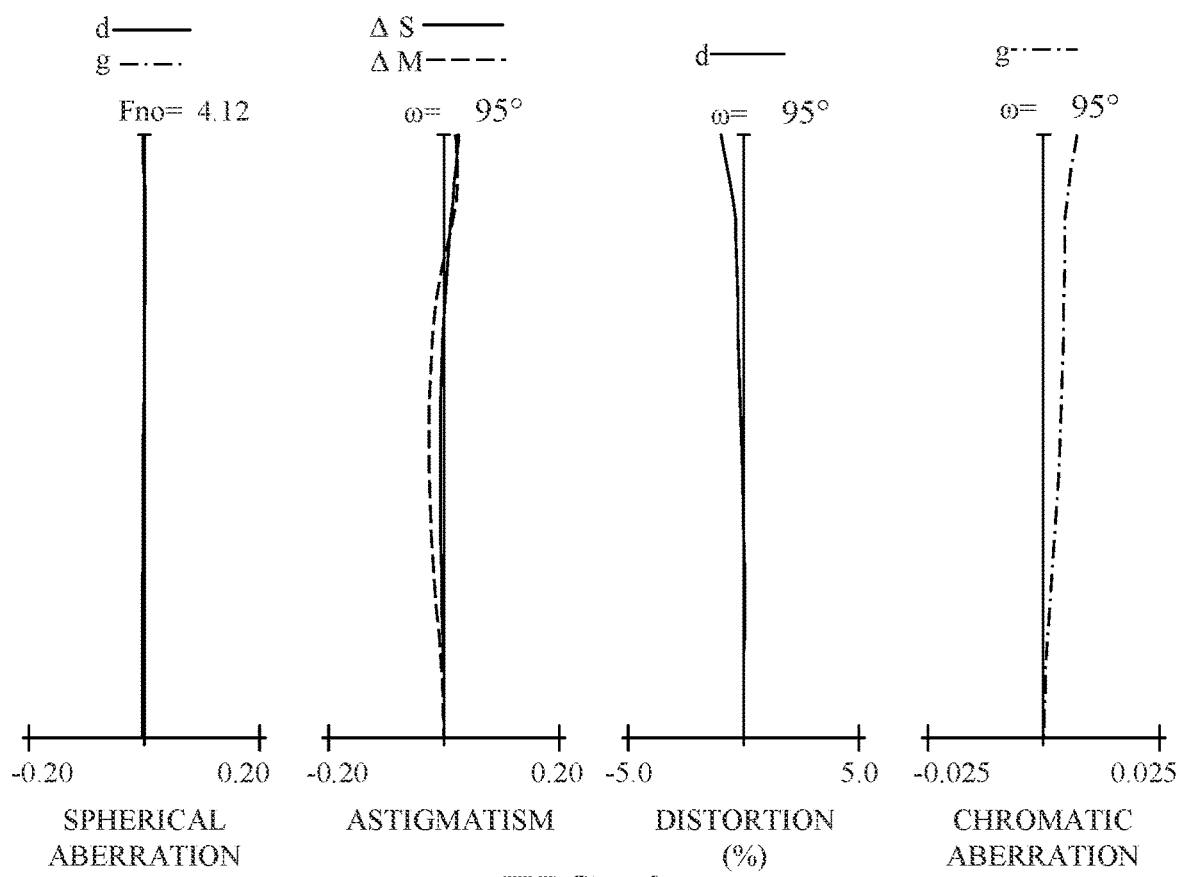
FIG. 6 is aberration diagrams of the optical system according to Example 3.
Figure 7:
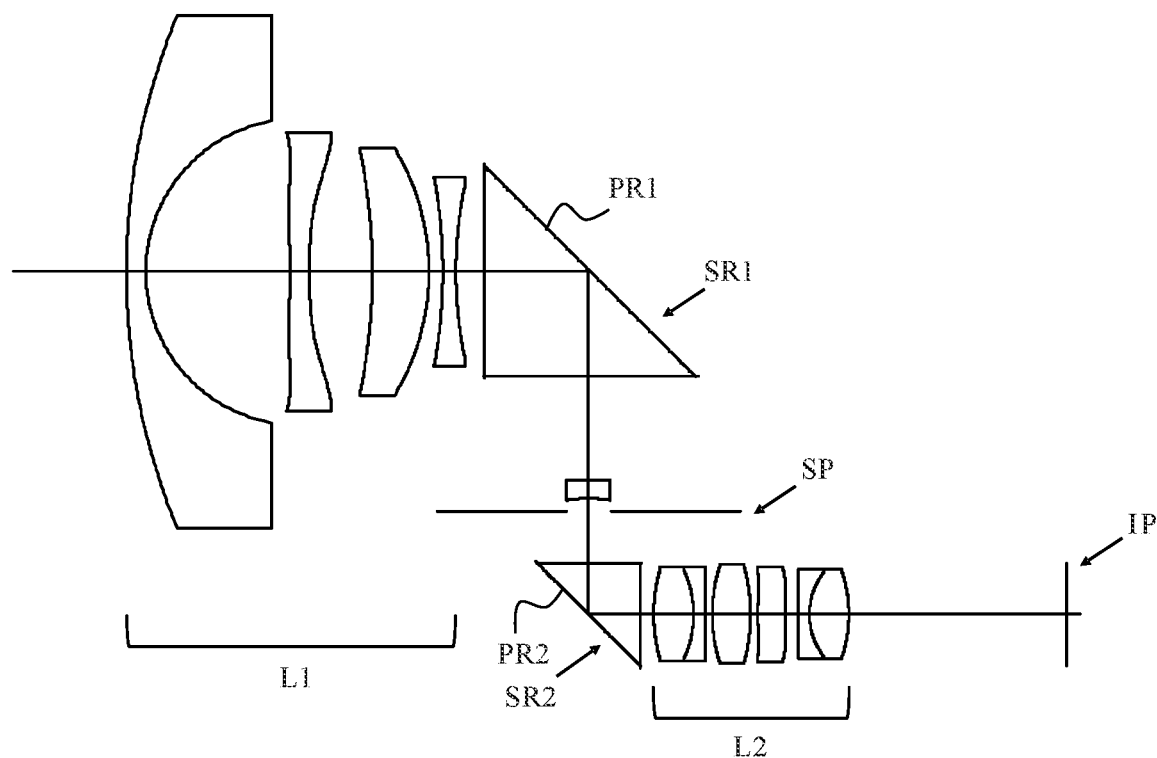
FIG. 7 is a sectional view of an optical system according to Example 4.
Figure 8:
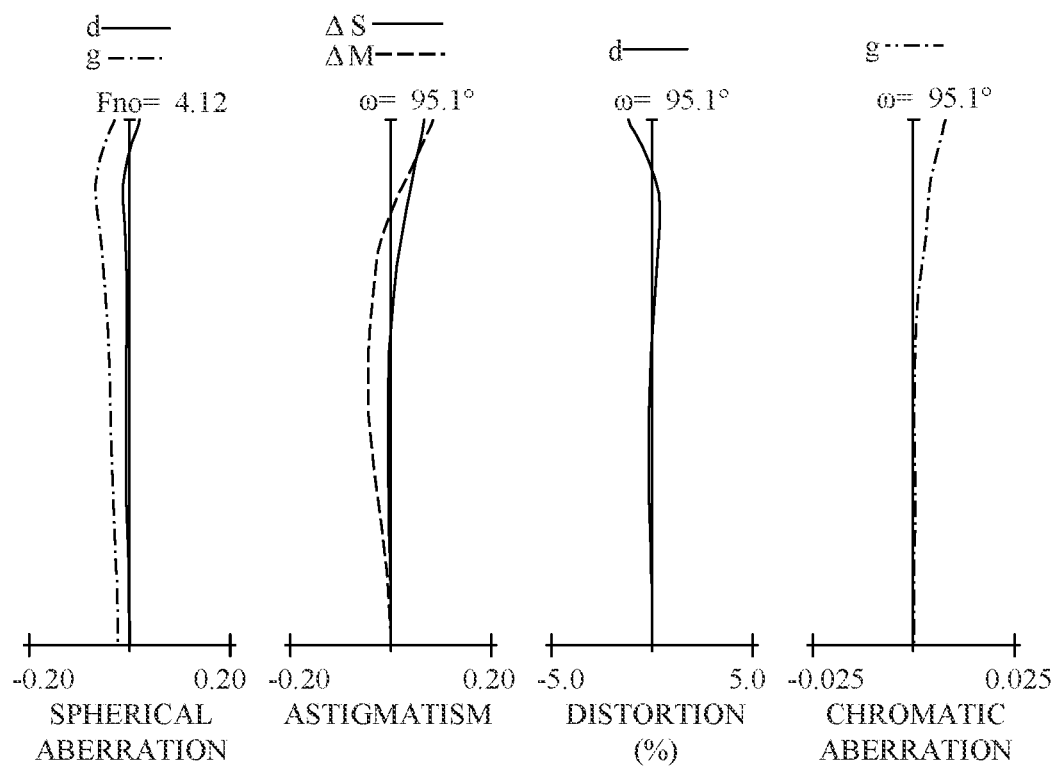
FIG. 8 is aberration diagrams of the optical system according to Example 4.
Figure 9:
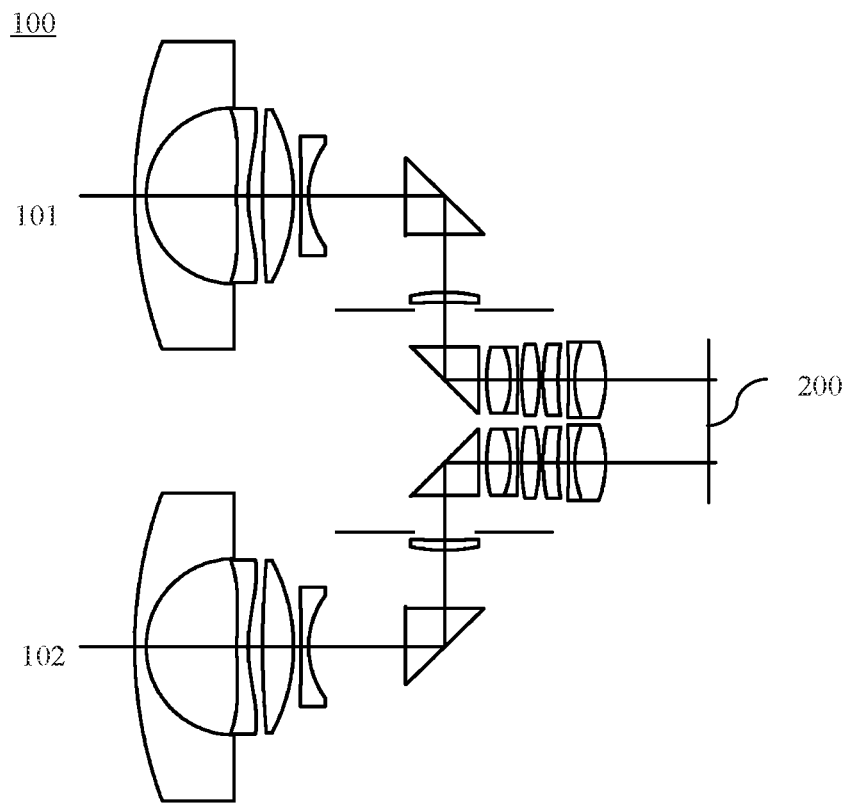
FIG. 9 is a sectional view of a main part of a lens apparatus.
Figure 10:
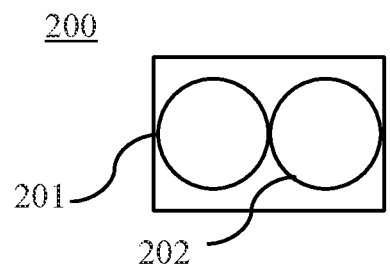
FIG. 10 is a diagram schematically illustrating image circles formed on one image sensor by two optical systems.

FIG. 9 is a sectional view of a main part of a lens apparatus 100 including two optical systems (wide angle lenses). As illustrated in FIG. 9, the lens apparatus 100 according to each example includes two optical systems 101 and 102, and the two optical systems 101 and 102 are arranged in parallel with respect to the image sensor 200. FIG. 10 is a diagram illustrating a state in which light rays incident on the optical systems 101 and 102 are bent by reflective prisms and image circles 201 and 202 of the two optical systems 101 and 102 are imaged in one image sensor 200. As illustrated in FIG. 10, the image circles 201 and 202 of two optical systems are arranged side by side on one image sensor 200. Images (optical images) are formed on an image plane of the image sensor 200 by the optical systems 101 and 102. That is, in the lens apparatus 100 according to this example, two optical images by the two optical systems are formed on one image sensor 200. The two optical systems 101 and 102 are held by an unillustrated housing. Since the optical systems 101 and 102 are the same in each example except for reflection directions of reflective members described later, a description is given of the optical system 101 as an example. Hereinafter, if the optical systems 101 and 102 are described to be the same in this specification, it means that the lens configurations and the like are the same except for the reflection directions of the reflective members.

The lens apparatus 100 according to each example is a lens apparatus used for an image pickup apparatus that can capture a stereoscopic image of an object with a wide angle of view of panorama imaging or the like.

FIG. 1, FIG. 3, FIG. 5, and FIG. 7 are sectional views of respective optical systems 101 according to Examples 1, 2, 3, and 4. The optical system 101 according to each example, which will be described later, includes reflective prisms PR1 (first reflective member) and PR2 (second reflective member) as two reflective members, and an optical path is actually reflected twice (the optical path is bent twice).

FIG. 2, FIG. 4, FIG. 6, and FIG. 8 are aberration diagrams of the optical systems 101 focusing on objects at infinite distances according to Examples 1, 2, 3, and 4, respectively.

In each lens sectional view, a left side is an object side (front side) and a right side is an image side (rear side). The optical system 101 according to each example includes a plurality of lens units. A lens unit may consist of a single lens or may include a plurality of lenses. A lens unit may include an aperture diaphragm.

In each lens sectional view, Li represents an i-th lens unit (i is a natural number) counted from the object side. SP represents an aperture diaphragm. IP represents an image plane. In a case where the optical system 101 according to each example is used as an image pickup optical system for a digital still camera or a digital video camera, an imaging plane of a solid-state image sensor (photoelectric conversion element) such as a CCD sensor and a CMOS sensor is disposed as the image plane IP. In a case where the optical system 101 according to each example is used as an image pickup optical system for a silver-halide film camera, a photosensitive surface corresponding to a film surface is disposed as the image plane IP. The optical system 101 according to each example may include an unillustrated optical block that corresponds to an optical filter, a face plate, a low-pass filter, an infrared cut filter, or the like and is disposed on the object of the image plane IP. PR1 and PR2 represent prisms.

In each spherical aberration diagram, Fno represents an F-number, and each spherical aberration diagram indicates spherical aberration amounts at a d-line (wavelength 587.6 nm) and at a g-line (wavelength 435.8 nm). In each astigmatism diagram, ΔS represents an astigmatism amount on a sagittal image plane, and ΔM represents an astigmatism amount on a meridional image plane. Each distortion diagram indicates a distortion amount at the d-line. Each chromatic aberration diagram indicates a chromatic aberration amount at the d-line. ω represents an imaging half angle of view (°).

In a case where a captured image is to be viewed while being displayed on a head mounted display etc., the captured image may be captured with a distance (base length) between optical axes on an incident side of the two optical systems set to a distance between human's eyes so that an experience of a realistic stereoscopic image is provided. Generally, the distance between the human's eyes is about 60 to 65 mm. The more greatly the base length is different from the distance between the human's eyes, the greater the deviation between the provided experience and a stereoscopic sensation when a human actually views the scene or a stereoscopic sensation based on the human's experience and the more likely discomfort is caused. In a case where the base length is too short, the left and right optical systems do not provide parallax, and a stereoscopic effect cannot be provided when the captured image is viewed. On the other hand, in a case where the base length is too long, parallax becomes too strong, and when the captured image is viewed, the stereoscopic effect is emphasized and a user is likely to feel tired.

Next, a description is given of a characteristic configuration of the optical system 101 according to each example.

In the lens apparatus 100 according to each example, the optical system 101 includes, in order from the object side to the image side, a first lens unit L1 having a negative refractive power, a first reflective member PR1, a second reflective member PR2, and a second lens unit L2 having a positive refractive power. A reflective surface of the first reflective member PR1 is referred to as a first reflective surface SR1 and a reflective surface of the second reflective member PR2 is referred to as a second reflective surface SR2. The lens apparatus 100 according to each example has a configuration with which one image sensor can include image circles of two wide-angle optical systems while a base length between the two wide-angle optical systems is ensured.

In the lens apparatus 100 according to each example, the optical system 101 satisfies the following inequalities (1) and (2). Here, DR represents a distance on an optical axis from the reflective surface (SR1) of the first reflective member PR1 to the reflective surface (SR2) of the second reflective member PR2. f represents a focal length of the optical system 101, and f2 represents a focal length of the second lens unit L2. Further, D2 represents a distance on the optical axis from the reflective surface (SR2) of the second reflective member PR2 to the image plane IP.

$$5.9 < DR/f < 13.6 \tag{1}$$

$$0.7 < D2/f2 < 5.2 \tag{2}$$

The inequality (1) defines a ratio between the distance on the optical axis from the first reflective surface SR1 to the second reflective surface SR2 and the focal length of the optical system 101. If the value is smaller than the lower limit value of the inequality (1), a distance is narrow between optical axes of the first lens units L1 of the two parallelly arranged optical systems, and the base length is short. As a result, the parallax of an image obtained by the two optical systems becomes small, which makes it impossible to provide a stereoscopic effect. If the value is larger than the upper limit value of the inequality (1), the distance is too wide between the optical axes of the first lens unit L1 of the two parallelly arranged optical systems, which makes the parallax excessive.

The numerical range of the inequality (1) may be set to a range of the following inequality (1a). Further, the numerical range of the inequality (1) may be set to a range of the following inequality (1b).

$$6.2 < DR/f < 12.9 \tag{1a}$$

$$6.6 < DR/f < 12.3 \tag{1b}$$

The inequality (2) defines a ratio between the distance on the optical axis from the second reflective surface SR2 to the image plane IP and the focal length of the second lens unit L2. If the value is smaller than the lower limit value of the inequality (2), since the refractive power of the second lens unit L2 is weakened, a height of an off-axis light beam at the second lens unit L2 increases, and a lens diameter of the second lens unit L2 increases. As a result, the second lens units L2 of the two parallelly arranged optical systems interfere with each other. If the value is larger than the upper limit value of the inequality (2), the refractive power of the second lens unit L2 increases. Therefore, it is necessary to increase an angle of the off-axis light beam that enters the second lens unit L2 after exiting the first lens unit L1. As a result, a lens diameter of the first lens unit L1 increases, and the parallelly arranged optical systems interfere with each other. If this is avoided by reducing the distance DR on the optical axis from the first reflective surface SR1 to the second reflective surface SR2, a proper base length cannot be ensured. In addition, the distance D2 from the second reflective surface SR2 to the image plane IP decreases, which deteriorates comfort in gripping (easiness of holding) the lens apparatus and the image pickup apparatus.

The numerical range of the inequality (2) may be set to a range of the following inequality (2a). Further, the numerical range of the inequality (2) may be set to a range of the following inequality (2b).

$$0.8 < D2/f2 < 4.6 \tag{2a}$$

$$1.0 < D2/f2 < 3.8 \tag{2b}$$

With the above configuration, it is possible to provide a lens apparatus capable of performing stereoscopic imaging in which one small image sensor captures an image formed by each of two optical systems.

Next, a description is given of conditions and configurations which the lens apparatus 100 according to each example may satisfy. The conditions and configurations described below may be satisfied by at least one of the two optical systems 101 and 102. Alternatively, both the two optical systems 101 and 102 may be made to satisfy the conditions and configurations described below by, for example, making the two optical systems 101 and 102 have the same configuration.

In the lens apparatus 100 according to each example, the optical system 101 according to each example may satisfy the following inequality (3) by bending the optical path using the reflective member. Here, Din represents a distance between surface vertexes of respective most object side lenses in the two optical systems 101 and 102 (a lens disposed at a position closest to an object side in an optical system is referred to as "most object side lens" in the optical system), and Dout represents a distance between surface vertexes of respective most image side lenses in the two optical systems 101 and 102 (a lens disposed at a position closest to an image side in an optical system is referred to as "most image side lens" in the optical system).

$$0.03 < Dout/Din < 0.50 \tag{3}$$

The inequality (3) defines the distance between the lens surfaces on the object side of the two optical systems 101 and 102 and the distance between the lens surfaces on the image side of the two optical systems 101 and 102. If the value is smaller than the lower limit value of the inequality (3), the base length is insufficient, making it difficult to capture a natural stereoscopic image. If the value is larger than the upper limit value of the inequality (3), the parallax becomes excessive, which also makes it difficult to capture a natural stereoscopic image.

The numerical range of the inequality (3) may be set to a range of the following inequality (3a). Further, the numerical range of the inequality (3) may be set to a range of the following inequality (3b).

$$0.05 < Dout/Din < 0.40 \tag{3a}$$

$$0.09 < Dout/Din < 0.30 \tag{3b}$$

In the lens apparatus 100 according to each example, the optical system 101 may satisfy the following inequality (4) where Dtotal represents a distance on the optical axis from a surface on the object side (object side surface) of the most object side lens to the image plane IP.

$$28.2 < Dtotal/f < 52.0 \tag{4}$$

The inequality (4) defines a ratio between the distance on the optical axis from the object side surface of the most object side lens in the optical system 101 to the image plane IP and the focal length of the optical system 101. If the value is smaller than the lower limit value of the inequality (4), a total length of the optical system 101 is shortened, which makes it difficult to ensure a proper base length for stereoscopic viewing, to dispose a reflective surface for ensuring the proper base length, and to ensure comfort in gripping. If the value is larger than the upper limit value of the inequality (4), since the first lens unit L1 and the second lens unit L2 are away from the aperture diaphragm SP, the lens diameter becomes large and interference between the parallelly arranged optical systems cannot be avoided.

The numerical range of the inequality (4) may be set to a range of the following inequality (4a). Further, the numerical range of the inequality (4) may be set to a range of the following inequality (4b).

$$29.2 < Dtotal/f < 49.5 \tag{4a}$$

$$30.2 < Dtotal/f < 47.2 \tag{4b}$$

In the lens apparatus 100 according to each example, the optical system 101 may satisfy the following inequality (5) where D1 represents a distance on the optical axis from an object side surface of a most object side lens in the first lens unit L1 to the reflective surface (SR1) of the first reflective member PR1.

$$8.4 < D1/f < 23.5 \tag{5}$$

The inequality (5) defines a ratio between the distance on the optical axis from the object side surface of the most object side lens in the first lens unit L1 to the first reflective surface SR1 and the focal length of the optical system 101. If the value is smaller than the lower limit value of the inequality (5), a position of the first lens unit L1 is close to a position of the second lens unit L2, and a proper base length cannot be ensured. If the value is larger than the upper limit value of the inequality (5), since the aperture diaphragm SP is away from the first lens unit L1, a lens diameter of the first lens unit L1 increases, and the first lens units L1 of the two parallelly arranged optical systems interfere with each other.

The numerical range of the inequality (5) may be set to a range of the following inequality (5a). Further, the numerical range of the inequality (5) may be set to a range of the following inequality (5b).

$$9.8 < D/f < 21.0 \tag{5a}$$

$$11.1 < D1/f < 18.5 \tag{5b}$$

In the lens apparatus 100 according to each example, the optical system 101 may satisfy the following inequality (6) where f1 represents a focal length of the first lens unit L1.

$$-4.3 < f1/f < -0.8 \tag{6}$$

The inequality (6) defines a ratio between the focal length of the first lens unit L1 and the focal length of the optical system 101. If the value is smaller than the lower limit value of the inequality (6), the refractive power of the first lens unit L1 is weak, and the lens diameter of the first lens unit L1 increases. As a result, the first lens units L1 of the two parallelly arranged optical systems are likely to interfere with each other. If the value is larger than the upper limit value of the inequality (6), since the refractive power of the first lens unit L1 is strong, a diameter of an on-axis light beam incident on the second lens unit L2 increases, and a lens diameter of the second lens unit L2 increases. Therefore, the second lens units L2 of the two parallelly arranged optical systems interfere with each other.

The numerical range of the inequality (6) may be set to a range of the following inequality (6a). Further, the numerical range of the inequality (6) may be set to a range of the following inequality (6b).

$$-3.7 < f1/f < -0.9 \tag{6a}$$

$$-3.3 < f1/f < -1.1 \tag{6b}$$

In the lens apparatus 100 according to each example, the optical system 101 may include an aperture diaphragm SP between the reflective surface (SR1) of the first reflective member PR1 and the reflective surface (SR2) of the second reflective member PR2. If the aperture diaphragm SP is disposed on the object side of the first reflective surface SR1, since the second lens unit L2 is away from the aperture diaphragm SP, a lens diameter of the second lens unit L2 increases. As a result, the second lens units L2 of the two parallelly arranged optical systems interfere with each other. If the aperture diaphragm SP is disposed on the image side of the second reflective surface SR2, the aperture diaphragms SP of the two parallelly arranged optical systems interfere with each other.

In the lens apparatus 100 according to each example, the optical system 101 may satisfy the following inequality (7) where DP represents a distance on the optical axis from the aperture diaphragm SP to the image plane IP.

$$10.4 < DP/f < 22.5 \tag{7}$$

The inequality (7) defines a ratio between the distance on the optical axis from the aperture diaphragm SP to the image plane IP and the focal length of the optical system 101. If the value is smaller than the lower limit value of the inequality (7), the aperture diaphragm SP is close to the second reflective surface SR2, and a lens barrel holding the second lens unit L2 interferes with the aperture diaphragm SP. If the value is larger than the upper limit value of the inequality (7), since the second lens unit L2 is far from the aperture diaphragm SP, a lens diameter of the second lens unit L2 increases, and the second lens units L2 of the two parallelly arranged optical systems are likely to interfere with each other.

The numerical range of the inequality (7) may be set to a range of the following inequality (7a). Further, the numerical range of the inequality (7) may be set to a range of the following inequality (7b).

$$11.8 < DP/f < 21.3 \tag{7a}$$

$$12.3 < DP/f < 19.8 \tag{7b}$$

In the lens apparatus 100 according to each example, the optical system 101 may satisfy the following inequality (8) where f1 represents the focal length of the first lens unit L1.

$$-1.25 < f1/f2 < -0.05 \tag{8}$$

The inequality (8) defines a ratio between the focal length of the first lens unit L1 and the focal length of the second lens unit L2. If the value is smaller than the lower limit value of the inequality (8), since the refractive power of the first lens unit L1 is weak, the aperture diaphragm SP is disposed at a position relatively close to the image side in the optical system 101. As a result, the aperture diaphragm SP approaches the second reflective surface SR2, and the lens barrel holding the second lens unit L2 interferes with the aperture diaphragm SP. If the value is larger than the upper limit value of the inequality (8), since the refractive power of the first lens unit L1 is strong, the aperture diaphragm SP is disposed at a position relatively close to the object side of the optical system 101. Therefore, the second lens unit L2 becomes far from the aperture diaphragm SP, the lens diameter of the second lens unit L2 increases, and the second lens units L2 of the two parallelly arranged optical systems are likely to interfere with each other.

The numerical range of the inequality (8) may be set to a range of the following inequality (8a). Further, the numerical range of the inequality (8) may be set to a range of the following inequality (8b).

$$-1.03 < f1/f2 < -0.06 \tag{8a}$$

$$-0.80 < f1/f2 < -0.07 \tag{8b}$$

Next, a description is given of the lens apparatus 100 according to each example.

In the lens apparatus 100 according to each example, the two optical systems 101 and 102 each having an angle of view of 950 are parallelly arranged. Each of the optical systems 101 and 102 includes, in order from the object side to the image side, the first lens unit L1 having the negative refractive power, the first reflective member PR1, the second reflective member PR2, and the second lens unit L2 having the positive refractive power. Each of the optical systems 101 and 102 includes the aperture diaphragm SP between the first reflective member PR1 and the second reflective member PR2.

In Example 1, an image height is 5.25 mm and a base length is 60 mm.

In Example 2, an image height is 5.25 mm and a base length is 55 mm.

In Example 3, an image height is 4.00 mm and a base length is 65 mm.

In Example 4, an image height is 4.00 mm and a base length is 60 mm.

Numerical Examples 1 to 4 respectively corresponding to Examples 1 to 4 are given below.

In surface data of each numerical example, r represents a curvature radius of each optical surface, and d (mm) represents an on-axis distance, i.e., a distance on an optical axis, between an m-th surface and an (m+1)-th surface. m is the number of the surface counted from a light incident side. nd represents a refractive index at the d-line of each optical member, and vd represents an abbe number of each optical member. An abbe number vd of a certain material is expressed by the following equation, where Nd, NF, and NC represent refractive indexes at the d-line (587.6 nm), F-line (486.1 nm), and C-line (656.3 nm) of Fraunhofer lines.

$$vd = (Nd-1)/(NF-NC)$$

In each numerical example, d, a focal length (mm), an F-number, and a half angle of view (°) are values in a state where the optical system according to each example focuses on an object at an infinite distance. "Back focus" refers to an air conversion length of a distance on the optical axis from a last lens surface (lens surface closest to the image side) to a paraxial image plane. "Overall lens length" refers to a length acquired by adding the back focus to a distance on the optical axis from a front lens surface (lens surface closest to the object side) of the optical system to the last surface of the optical system. "Lens unit" is not limited to a lens unit including a plurality of lenses, and may consist of a single lens.

Each of Numerical Examples 1 to 4 uses a method in which the entire optical system is extended in focusing from an object at an infinite distance to an object at a short distance. However, focusing may be performed by driving part of lenses of the optical system in order that a weight of a driving unit is decreased.

If an optical surface is an aspherical surface, a sign * is attached to a right side of the surface number. An aspherical surface shape is expressed by the following equation where X represents a displacement amount in an optical axis direction from a surface vertex, h represents a height in a direction orthogonal to the optical axis from the optical axis, R represents a paraxial curvature radius, k represents a conic constant, and A4, A6, A8, and A10 represent aspherical surface coefficients of respective orders.

$$X=(h^2/R)/[1+\{1-(1+k)(h/R)^2\}^{1/2}+A4\times h^4+A6\times h^6+A8\times h^8+A10\times h^{10}]$$

"e±XX" in each aspherical surface coefficient represent "$\times 10^{\pm XX}$".

Numerical Example 1

Unit: mm

SURFACE DATA

| Surface Number | r | d | nd | vd |
|---|---|---|---|---|
| 1 | 58.435 | 1.50 | 1.95375 | 32.3 |
| 2 | 11.589 | 11.88 | | |
| 3* | 80.003 | 1.50 | 1.53110 | 55.9 |
| 4* | 19.808 | 1.93 | | |
| 5 | 134.790 | 4.03 | 1.84666 | 23.8 |
| 6 | −23.935 | 1.00 | | |
| 7 | −232.303 | 1.00 | 1.90043 | 37.4 |
| 8 | 11.486 | 12.73 | | |
| 9 | ∞ | 5.09 | 2.00100 | 29.1 |
| 10 (Reflective Surface) | ∞ | 5.09 | | |
| 11 | ∞ | 7.59 | | |
| 12 | 20.947 | 1.35 | 1.72825 | 28.5 |
| 13 | 123.806 | 1.00 | | |
| 14 (Diaphragm) | ∞ | 4.65 | | |
| 15 | ∞ | 4.51 | 2.00100 | 29.1 |
| 16 (Reflective Surface) | ∞ | 4.51 | | |
| 17 | ∞ | 1.00 | | |
| 18 | 17.730 | 3.13 | 1.53172 | 48.8 |
| 19 | −11.272 | 0.95 | 1.91082 | 35.3 |
| 20 | −122.331 | 0.50 | | |
| 21 | 24.195 | 2.32 | 1.51742 | 52.4 |
| 22 | −21.125 | 0.50 | | |
| 23* | 23.883 | 1.98 | 1.49700 | 81.5 |
| 24* | 55.605 | 1.39 | | |
| 25 | −65.413 | 0.80 | 2.00069 | 25.5 |
| 26 | 13.474 | 4.02 | 1.49700 | 81.5 |
| 27 | −14.610 | 13.50 | | |
| Image Plane | ∞ | | | |

ASPHERICAL SURFACE DATA

3rd Surface

K = 0.00000e+00 A 4 = −1.12559e−04 A 6 = 8.80679e−08
A 8 = 8.84499e−10 A10 = −4.41464e−12
4th Surface K = 0.00000e+00 A 4 = −1.70848e−04 A 6 = −2.47322e−07
A 8 = 6.13977e−09 A10 = −2.57395e−11

-continued

Unit: mm

23rd Surface

K = 0.00000e+00 A 4 = 1.69563e−04 A 6 = −1.84891e−05
A 8 = 2.10218e−06 A10 = −1.02425e−07 A12 = 1.95774e−09
24th Surface K = 0.00000e+00 A 4 = 3.65709e−04 A 6 = −2.61691e−05
A 8 = 3.31846e−06 A10 = −1.79555e−07 A12 = 3.81587e−09

VARIOUS DATA

| Focal length: | 3.19 |
|---|---|
| F-Number: | 2.80 |
| Half Angle of View (°): | 95.0 |
| Image Height: | 5.25 |
| BF: | 13.50 |

LENS UNIT DATA

| Unit | Starting Surface | Last Surface | Focal Length |
|---|---|---|---|
| L1 | 1 | 8 | −5.15 |
| L2 | 18 | 27 | 23.01 |

Unit: mm

SURFACE DATA

| Surface Number | r | d | nd | vd |
|---|---|---|---|---|
| 1 | 60.042 | 1.50 | 1.95375 | 32.3 |
| 2 | 11.746 | 12.15 | | |
| 3* | 43.358 | 1.50 | 1.53110 | 55.9 |
| 4* | 16.280 | 1.62 | | |
| 5 | 71.826 | 3.99 | 1.84666 | 23.8 |
| 6 | −25.902 | 1.00 | | |
| 7 | −107.934 | 1.00 | 1.90043 | 37.4 |
| 8 | 10.969 | 14.01 | | |
| 9 | ∞ | 5.07 | 2.00100 | 29.1 |
| 10 (Reflective Surface) | ∞ | 5.07 | | |
| 11 | ∞ | 5.10 | | |
| 12 | 20.096 | 1.36 | 1.72825 | 28.5 |
| 13 | 118.601 | 1.00 | | |
| 14 (Diaphragm) | ∞ | 4.66 | | |
| 15 | ∞ | 4.50 | 2.00100 | 29.1 |
| 16 (Reflective Surface) | ∞ | 4.50 | | |
| 17 | ∞ | 1.00 | | |
| 18 | 17.734 | 3.14 | 1.53172 | 48.8 |
| 19 | −10.903 | 0.95 | 1.91082 | 35.3 |
| 20 | −105.912 | 0.50 | | |
| 21 | 22.009 | 2.35 | 1.51742 | 52.4 |
| 22 | −21.155 | 0.50 | | |
| 23* | 24.891 | 1.92 | 1.49700 | 81.5 |
| 24* | 43.102 | 1.40 | | |
| 25 | −79.465 | 0.80 | 2.00069 | 25.5 |
| 26 | 12.802 | 4.09 | 1.49700 | 81.5 |
| 27 | −14.100 | 13.50 | | |
| Image Plane | ∞ | | | |

ASPHERICAL SURFACE DATA

3rd Surface

K = 0.00000e+00 A 4 = −1.84379e−04 A 6 = 1.15914e−06
A 8 = −5.95233e−09 A10 = 1.31321e−11
4th Surface K = 0.00000e+00 A 4 = −2.74423e−04 A 6 = 8.94202e−07
A 8 = −1.50307e−09 A10 = −6.84730e−12
23rd Surface K = 0.00000e+00 A 4 = 1.74548e−04 A 6 = −2.25293e−05
A 8 = 2.39561e−06 A10 = −1.14506e−07 A12 = 2.14783e−09

-continued

Unit: mm

24th Surface

K = 0.00000e+00 A 4 = 3.77778e−04 A 6 = −2.84287e−05
A 8 = 3.37725e−06 A10 = −1.80434e−07 A12 = 3.82065e−09

VARIOUS DATA

| | |
|---|---|
| Focal length: | 3.19 |
| F-Number: | 2.80 |
| Half Angle of View (°): | 95.0 |
| Image Height: | 5.25 |
| BF: | 13.50 |

LENS UNIT DATA

| Unit | Starting Surface | Last Surface | Focal Length |
|---|---|---|---|
| L1 | 1 | 8 | −4.90 |
| L2 | 18 | 27 | 22.78 |

Numerical Example 3

Unit: mm

SURFACE DATA

| Surface Number | r | d | nd | vd |
|---|---|---|---|---|
| 1 | 47.656 | 1.50 | 1.90043 | 37.4 |
| 2 | 11.393 | 11.43 | | |
| 3* | −32.750 | 1.50 | 1.53110 | 55.9 |
| 4* | 142.609 | 6.96 | | |
| 5 | −188.682 | 4.05 | 1.80518 | 25.4 |
| 6 | −18.835 | 1.00 | | |
| 7 | −69.772 | 1.00 | 2.00100 | 29.1 |
| 8 | 9.671 | 12.03 | | |
| 9 | ∞ | 4.01 | 2.00100 | 29.1 |
| 10 (Reflective Surface) | ∞ | 4.01 | | |
| 11 | ∞ | 9.15 | | |
| 12 | −286.515 | 2.07 | 1.80518 | 25.4 |
| 13 | −20.203 | 3.31 | | |
| 14 (Diaphragm) | ∞ | 4.41 | | |
| 15 | ∞ | 3.55 | 2.00100 | 29.1 |
| 16 (Reflective Surface) | ∞ | 3.55 | | |
| 17 | ∞ | 1.41 | | |
| 18 | 16.136 | 2.67 | 1.53172 | 48.8 |
| 19 | −7.681 | 0.95 | 1.95375 | 32.3 |
| 20 | 95.771 | 0.98 | | |
| 21 | 15.372 | 2.61 | 1.64769 | 33.8 |
| 22 | −16.828 | 0.50 | | |
| 23 | −26.800 | 2.09 | 1.84666 | 23.8 |
| 24 | −19.252 | 1.75 | | |
| 25 | 53.571 | 0.80 | 2.00069 | 25.5 |
| 26 | 6.136 | 3.23 | 1.49700 | 81.6 |
| 27 | −15.725 | 14.80 | | |
| Image Plane | ∞ | | | |

ASPHERICAL SURFACE DATA

3rd Surface

K = = 0.00000e+000 A 4 = 1.82668e−004 A 6 = −6.2.7594e−007
A 8 = 1.68239e−009 A10 = −8.54689e−012

4th Surface

K = 0.00000e+000 A 4 = 1.48208e−004 A 6 = 5.23490e−007
A 8 = −6.34100e−009 A10 = 2.94229e−011

| | |
|---|---|
| Focal length: | 2.44 |
| F-Number: | 4.12 |
| Half Angle of View (°): | 95.0 |

-continued

Unit: mm

| | |
|---|---|
| Image Height: | 4.00 |
| BF: | 14.80 |

LENS UNIT DATA

| Unit | Starting Surface | Last Surface | Focal Length |
|---|---|---|---|
| L1 | 1 | 8 | −3.34 |
| L2 | 18 | 27 | 28.15 |

Numerical Example 4

Unit: mm

SURFACE DATA

| Surface Number | r | d | nd | vd |
|---|---|---|---|---|
| 1 | 52.026 | 1.50 | 1.95375 | 32.3 |
| 2 | 11.875 | 11.11 | | |
| 3* | −70.530 | 1.50 | 1.53110 | 55.9 |
| 4* | 44.705 | 4.89 | | |
| 5 | −46.470 | 4.36 | 1.84666 | 23.8 |
| 6 | −18.673 | 1.08 | | |
| 7 | −39.477 | 1.00 | 1.83481 | 42.7 |
| 8 | 32.001 | 2.20 | | |
| 9 | ∞ | 8.06 | 2.00100 | 29.1 |
| 10 (Reflective Surface) | ∞ | 8.06 | | |
| 11 | ∞ | 8.01 | | |
| 12 | −456.978 | 1.45 | 1.83481 | 42.7 |
| 13 | 11.638 | 1.00 | | |
| 14 (Diaphragm) | ∞ | 4.03 | | |
| 15 | ∞ | 3.95 | 2.00100 | 29.1 |
| 16 (Reflective Surface) | ∞ | 3.94 | | |
| 17 | ∞ | 1.08 | | |
| 18 | 13.236 | 3.07 | 1.80518 | 25.4 |
| 19 | −8.221 | 0.95 | 2.00100 | 29.1 |
| 20 | −183.054 | 0.50 | | |
| 21 | 12.214 | 2.96 | 1.49700 | 81.6 |
| 22 | −14.644 | 0.56 | | |
| 23* | 38.206 | 2.15 | 1.53110 | 55.9 |
| 24* | −1351.203 | 1.03 | | |
| 25 | −211.102 | 0.80 | 2.00069 | 25.5 |
| 26 | 5.353 | 3.04 | 1.48749 | 70.2 |
| 27 | −10.898 | 16.83 | | |
| Image Plane | ∞ | | | |

ASPHERICAL SURFACE DATA

3rd Surface

K = 0.00000e+000 A 4 = 2.37623e−004 A 6 = −2.54505e−006
A 8 = 1.28437e−008 A10 = −4.59056e−011

4th Surface

K = 0.00000e+000 A 4 = 2.50792e−004 A 6 = −2.48114e−006
A 8 = 4.49008e−009 A10 = 6.50975e−012

23rd Surface

K = 0.00000e+000 A 4 = −1.06779e−003 A 6 = −2.53375e−005
A 8 = 1.97387e−006 A10 = −1.61074e−007 A12 = 3.59609e−009

24th Surface

K = 0.00000e+000 A 4 = −1.16434e−003 A 6 = −1.83981e−005
A 8 = 1.59211e−006 A10 = −1.56490e−007 A12 = 4.38431e−009

| | |
|---|---|
| Focal length: | 2.44 |
| F-Number: | 4.12 |
| Half Angle of View (°): | 95.1 |
| Image Height: | 4.00 |
| BF: | 16.83 |

-continued

Unit: mm

LENS UNIT DATA

| Unit | Starting Surface | Last Surface | Focal Length |
|---|---|---|---|
| L1 | 1 | 8 | −7.11 |
| L2 | 18 | 27 | 11.58 |

Various values according to each numerical example are summarized in the following Table 1. In each example, the d-line is a reference wavelength, and values in the following Table 1 are values at this reference wavelength.

TABLE 1

|  | Ex. 1 | Ex. 2 | Ex. 3 | Ex. 4 |
|---|---|---|---|---|
| Inequality (1) | 7.6 | 6.8 | 11.9 | 10.8 |
| Inequality (2) | 1.5 | 1.5 | 1.2 | 3.2 |
| Inequality (3) | 0.18 | 0.20 | 0.12 | 0.13 |
| Inequality (4) | 31.2 | 30.8 | 44.3 | 40.6 |
| Inequality (5) | 12.8 | 13.1 | 17.9 | 14.6 |
| Inequality (6) | −1.6 | −1.5 | −1.5 | −2.9 |
| Inequality (7) | 13.7 | 13.7 | 17.8 | 18.4 |
| Inequality (8) | −0.22 | −0.21 | −0.12 | −0.61 |

Image Pickup Apparatus

Figure 11:
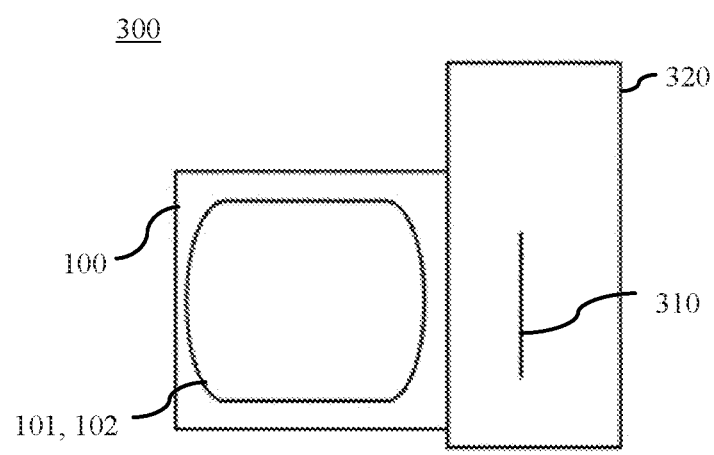
FIG. 11 is a schematic diagram of an image pickup apparatus.

Next, a description is given of an embodiment of an image pickup apparatus according to the present disclosure. FIG. 11 is a schematic diagram of the image pickup apparatus (digital still camera) 300 according to this embodiment. The image pickup apparatus 300 includes a camera body 320 having an image sensor 310 and a lens apparatus 100 including optical systems 101 and 102 similar to any of Examples 1 to 4 described above. The lens apparatus 100 and the camera body 320 may be integrally configured or may be detachably attachable to each other. The camera body 320 may be a so-called single-lens reflex camera having a quick turn mirror or a so-called mirrorless camera not having a quick turn mirror. The image sensor 310 is a solid-state image sensor (photoelectric conversion element), such as a CCD sensor and a CMOS sensor, that receives an optical image formed by each of the optical systems 101 and 102 and performs photoelectric conversion. Although only one optical system is illustrated in FIG. 11, two optical systems are arranged side by side in a depth direction.

By having the lens apparatus 100, the image pickup apparatus 300 in this embodiment can perform stereoscopic imaging in which one small image sensor captures an image formed by each of two optical systems.

The above-described optical system according to each example can be applied not only to the digital still camera illustrated in FIG. 11 but also to various image pickup apparatuses such as a broadcasting camera, a silver-halide film camera, and a monitoring camera.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-110988, filed on Jul. 2, 2021, which is hereby incorporated by reference herein in its entirety.

What is claimed is:

1. A lens apparatus comprising two optical systems, wherein each of the two optical systems includes, in order from an object side to an image side:
    a first lens unit having a negative refractive power;
    a first reflective member;
    an aperture diaphragm;
    a second reflective member; and
    a second lens unit having a positive refractive power, and
wherein each of the two optical systems satisfies following inequalities:

$$5.9 < DR/f < 13.6;$$

$$0.7 < D2/f2 < 5.2;$$

$$10.4 < DP/f < 19.8;$$

where DR represents a distance on an optical axis from a reflective surface of the first reflective member to a reflective surface of the second reflective member, f represents a focal length of the optical system, f2 represents a focal length of the second lens unit, D2 represents a distance on the optical axis from the reflective surface of the second reflective member to an image plane, and DP represents a distance on the optical axis from the aperture diaphragm to the image plane.

2. The lens apparatus according to claim 1, wherein a following inequality is satisfied:

$$0.03 < Dout/Din < 0.50;$$

where Din represents a distance between surface vertexes of respective most object side lenses in the two optical systems, and Dout represents a distance between surface vertexes of respective most image side lenses in the two optical systems.

3. The lens apparatus according to claim 1, wherein at least one of the two optical systems satisfies a following inequality:

$$28.2 < Dtotal/f < 52.0;$$

where Dtotal represents a distance on the optical axis from an object side surface of a most object side lens in the optical system to the image plane.

4. The lens apparatus according to claim 1, wherein at least one of the two optical systems satisfies a following inequality:

$$8.4 < D1/f < 23.5;$$

where D1 represents a distance on the optical axis from an object side surface of a most object side lens in the first lens unit to the reflective surface of the first reflective member.

5. The lens apparatus according to claim 1, wherein at least one of the two optical systems satisfies a following inequality:

$$-4.3 < f1/f < -0.8;$$

where f1 represents a focal length of the first lens unit.

6. The lens apparatus according to claim 1, wherein at least one of the two optical systems satisfies a following inequality:

$$-1.25 < f1/f2 < -0.05;$$

where f1 represents a focal length of the first lens unit.

7. The lens apparatus according to claim 1, wherein the two optical systems are arranged in parallel.

8. The lens apparatus according to claim 1, wherein in at least one of the two optical systems, an optical path is bent twice.

9. The lens apparatus according to claim 1, wherein the two optical systems are the same optical system as each other.

10. The lens apparatus according to claim 1, wherein each of the two optical systems consists of, in order from the object side to the image side, the first lens unit, the first reflective member, an intermediate lens unit, the aperture diaphragm, the second reflective member, and the second lens unit.

11. An image pickup apparatus comprising:
a lens apparatus including two optical systems; and
an image sensor configured to capture an optical image formed by each of the two optical systems,
wherein each of the two optical systems includes, in order from an object side to an image side:
a first lens unit having a negative refractive power;
a first reflective member;
an aperture diaphragm;
a second reflective member; and
a second lens unit having a positive refractive power, and
wherein each of the two optical systems satisfies following inequalities:

$5.9 < DR/f < 13.6;$ $0.7 < D2/f2 < 5.2;$ $10.4 < DP/f < 19.8;$ where DR represents a distance on an optical axis from a reflective surface of the first reflective member to a reflective surface of the second reflective member, f represents a focal length of the optical system, f2 represents a focal length of the second lens unit, D2 represents a distance on the optical axis from the reflective surface of the second reflective member to an image plane, and DP represents a distance on the optical axis from the aperture diaphragm to the image plane.

12. The image pickup apparatus according to claim 11, wherein the optical image formed by each of the two optical systems is captured by the one image sensor.

* * * * *